Nov. 24, 1959 K. FROEHLICH 2,914,041
HIGH COMPRESSION SPARK IGNITED GAS ENGINE AND METHOD
Filed June 20, 1956

Inventor
Kurt Froehlich
by Parker & Carter

United States Patent Office 2,914,041
Patented Nov. 24, 1959

2,914,041

HIGH COMPRESSION SPARK IGNITED GAS ENGINE AND METHOD

Kurt Froehlich, Milwaukee, Wis., assignor to Nordberg Manufacturing Company, Milwaukee, Wis., a corporation of Wisconsin Application June 20, 1956, Serial No. 592,622

4 Claims. (Cl. 123—1)

My invention is in the field of internal combustion engines and is a high compression gas engine and also is a method of operating a high compression gas engine as set forth below.

A primary object of my invention is a method of operating a high compression gas engine to insure ignition at all loads, particularly the light loads.

Another object is a gas engine with an auxiliary combustion chamber through which all of the fuel is admitted.

Another object is a high compression gas engine with an auxiliary chamber of the above type with means for maintaining a combustible mixture in it at all loads.

Another object is a high compression gas engine with means for insuring proper ignition at all loads.

Another object is a simplified method of operating a high compression gas engine so as to insure ignition at the lighter load.

Another object is a method of operating a high compression gas engine to maintain a lean mixture in the cylinders at all loads for better efficiency.

Other objects will appear from time to time in the ensuing specification and drawings in which.

Figure 1:
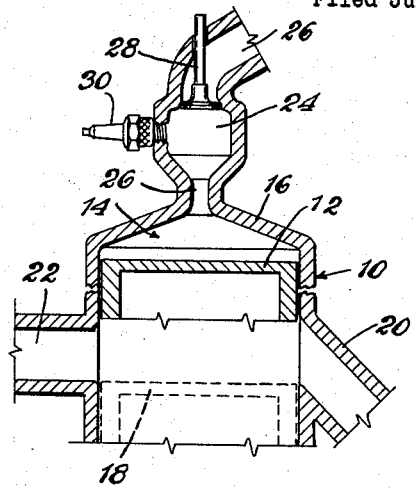
Figure 1 is a vertical section of one form of my invention.

In Figure 1 I have indicated an engine cylinder generally at 10 with the usual piston 12. In the upper full line position, the piston defines what I shall term a main combustion chamber 14 with the cylinder head 16. In its lower or dotted line position 18, which may be considered bottom dead center, the piston uncovers inlet ports at 20, for the admission of fresh air for combustion and exhaust ports at 22, for the exodus of the spent or burnt products of combustion. So far the engine will be recognized as a conventional two-cycle engine.

An auxiliary or precombustion chamber 24 communicates at a suitable point through the cylinder head by a throat or passage 26 with the main combustion chamber. The passage or throat is reduced in cross section and is much smaller in diameter than the auxiliary chamber. Gaseous fuel is brought in through a suitable pipe 26, or the like, from a suitable gas source and enters the auxiliary chamber under the control of a suitable valve 28 which is opened and closed by any conventional mechanism. Ignition may be obtained by a suitable spark plug 30 or the like in the auxiliary chamber.

Several of the important points are as follows. All the gaseous fuel supplied to the cylinder is first admitted to the auxiliary chamber and must pass through the throat 26 into the main combustion chamber. Only air is admitted through the ports 20 in the cylinder wall and it should be understood that the inlet and exhaust ports 20 and 22 around the cylinder wall can be arranged in any suitable manner and I have only shown them diagrammatically.

Considering the invention broadly for the moment, the use of high compression ratios in gas engines is highly desirable, for example 10, 11 and 12 to 1. However, ignition becomes faulty at the lower load, for example, at no load to half load, and possibly above, because the mixture in the cylinder is too lean. Throttling of the air inlet line to the engine is not desirable because it involves pumping losses. The range of fuel-air ratios within which an electric spark will ignite a fuel air mixture is quite limited; a highly complicated mechanism for accurately controlling the air and fuel supply to maintain the resulting mixture in the cylinder within this limited range is far too expensive and undesirable.

I provide a simplified method of obtaining, at the lighter loads, a well localized mixture with the proper air-fuel ratio for ignition. The procedure and apparatus is simple. All of the fuel flows through the auxiliary chamber 24, and through the passage or throat 26 into the cylinder. The combustion air is separately introduced. During the piston's compression stroke, air will be forced through the throat 26 into the auxiliary chamber so that around top dead center when the spark plug is energized, the mixture in the precombustion chamber will be within the critical range of ignition. At the lighter loads the mixture in the precombustion chamber will be ignitable, and it will serve as a high flame energy trigger for the too lean mixture in the main chamber.

Figure 2:
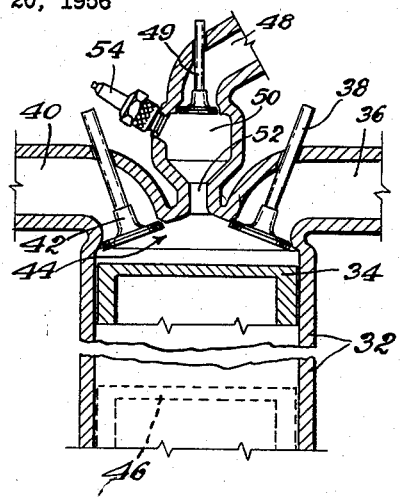
Figure 2 is a vertical section of a variant form.

In Figure 2 I have shown schematically a four-cycle engine which has the usual cylinder 32 and piston 34, an inlet port or passage 36 controlled by the usual inlet valve 38, and an exhaust port 40 controlled by an exhaust valve 42. The piston at top dead center, shown in full lines, defines the main combustion chamber 44 with the cylinder head, and bottom dead center is indicated generally at 46 in broken lines.

Gas is supplied through a conventional line 48 and valve 49 to an auxiliary combustion or precombustion chamber 50 which communicates with the main combustion chamber through a throat or reduced passage 52, a conventional spark plug 54 or the like being provided for the chamber.

The principle is substantially the same as Figure 1. The timing of the inlet and exhaust valve may be conventional. The gas valve, which admits all of the gas for the engine to the auxiliary combustion chamber, may be timed relative to the inlet and exhaust valve timing and also relative to the engine speed. But in any event the resulting mixture in the precombustion chamber 50 has an air-fuel ratio within the critical range due to air being forced back through the throat 52 by the piston during its compression stroke. All of the gas is admitted to the precombustion chamber first, and more or less may flow into the main combustion chamber, depending upon the load and the quantity of gas being supplied. All of the combustion air is admitted through the inlet port 36 and the burnt products of combustion leave by the port 40.

Normally all of the gas is admitted before compression starts. In two-cycle engines part of the gas may be admitted during the early part of the compression stroke, with the result that the mixture in the auxiliary chamber becomes richer. In all probability it can be held within the high limit of inflammability.

Figure 3:
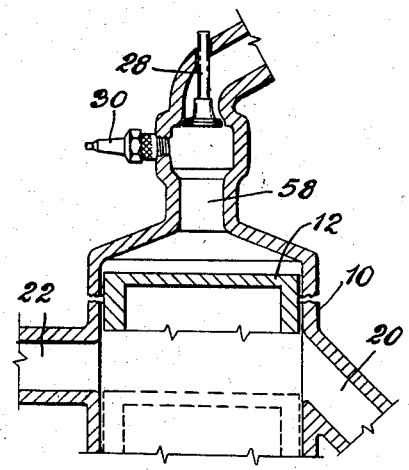
Figure 3 is a vertical section of another variant.

In those cases where it cannot be held within the critical range, the throat between the main and auxiliary combustion chambers may be increased in size so that more air may be forced from the cylinder to the precombustion chamber during the compression stroke to dilute the gas. In Figure 3, I have shown a two-cycle engine substantially the same as Figure 1 except that the throat 58 is substantially larger than throat 26 in Figure 1. This allows more air admitted through the inlet line or ports 20 to flow back under piston compression into the precombustion chamber to dilute the mixture to prevent it from being too rich.

Figure 4:
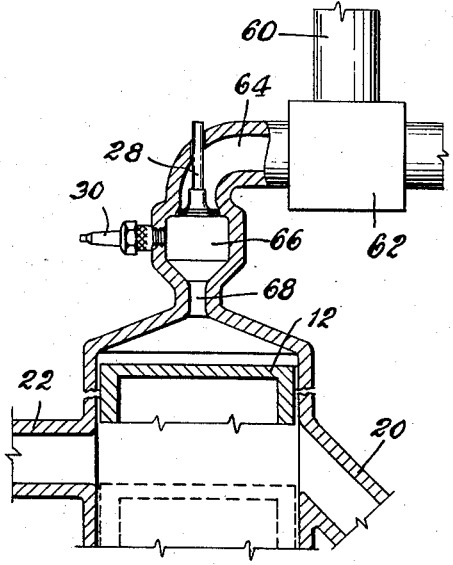
Figure 4 is a vertical section of still another variant.

Another way of diluting the mixture in the precombustion chamber in a two-cycle engine where gas is admitted during the early part of the compression stroke is shown in Figure 4 where a suitable air source 60 is connected to a mixer or blender 62 to dilute the incoming gas in the inlet line 64 leading to the precombustion chamber 66, and the throat 68 may be the same size as the throat in Figures 1 and 2. In this case air could be admitted to dilute the gas coming into the precombustion chamber, depending upon the load and operating conditions.

An important point is that, by admitting all of the gas to the precombustion chamber first and creating a combustible mixture in it, the mixture in the main chamber or cylinder at all loads must be lean, in fact too lean for combustion without the trigger of the precombustion chamber. This gives better efficiency and better fuel economy.

The use, operation and function of my invention are as follows:

I provide a precombustion chamber for either two or four-cycle engines which receives all of the gas being supplied to the engine. The chamber communicates with the main combustion chamber below the cylinder head by a throat or reduced cross section passage. A suitable ignition device, i.e. a spark plug, may be positioned in the precombustion chamber and energized at an appropriate time to ignite the mixture.

All of the air for combustion purposes is separately admitted directly to the cylinder. During piston compression some of the air from the cylinder is forced through the throat by the piston to dilute the gas in the precombustion chamber to form a combustible mixture therein. This is true at both the high and the low loads.

At the lighter loads in a high compression gas engine where the inlet is not throttled, the mixture in the cylinder will be too lean for ignition by a spark. By admitting all of the gas through the precombustion chamber and all of the air directly to the cylinder, air is forced back into the precombustion chamber during the piston's compression stroke to provide an enriched mixture within the limits of inflammability.

The invention can be used with various types of gases, for example methane, propane, natural gas, coke oven gas, producer gas and the like.

The engine should be designed with a high compression ratio, for example 11 to 1, which is a conventional diesel compression ratio. The volume of the precombustion chamber, the cross-sectional area of the throat, and the compression ratio must all be related to each other in design to acquire a combustible mixture in the auxiliary chamber at the light loads. Additionally, the particular type of gas being used, be it a low or a high B.t.u. gas, must also be considered.

In two-cycle engines where part of the gas may be admitted during the early part of the piston's compression srtoke, the throat should either be opened up, as in Figure 3, or air should be bled into the gas line, as in Figure 4, to lean down the mixture in the precombustion chamber. Or a combination of these two could be used.

In the case of a low B.t.u. gas, for example producer gas, where a high compression ratio is being used, it might be desirable to admit part of the gas during the compression stroke to make the mixture in the auxiliary chamber richer. On the other hand, the compression ratio for such a gas in all probability will be lower than for other gases, and the lower compression ratio will automatically make the mixture richer in the precombustion chamber.

While I have shown and described a preferred form and several modifications of my invention, it should be understood that numerous additional modifications, substitutions, alterations and changes can be made without departing from the invention's fundamental theme. I therefore wish that the invention be unrestricted except as by the appended claims.

I claim:

1. A method of operating a gas fueled high compression internal combustion engine over a selected load range, the engine having a main combustion chamber defined by the cylinder and piston at top dead center, and an auxiliary combustion chamber communicating with the main combustion chamber by a reduced cross section passage; including the steps of supplying all of the gas fuel in an incombustible state at all loads directly to the auxiliary combustion chamber in varying quantities depending upon the load and relative to the volume of the auxiliary combustion chamber such that at the higher loads a portion of the gas fuel in the auxiliary chamber will flow through the reduced cross section passage into the main combustion chamber and at the lower loads substantially all of the gas fuel will be confined to and will remain in the auxiliary combustion chamber, separately supplying, at all loads, only combustion air directly to the cylinder at least at a pressure as great as atmospheric, timing the admittance of both the gas fuel to the auxiliary combustion chamber and combustion air to the cylinder such that gas fuel will be admitted to the auxiliary combustion chamber no earlier than the beginning of air admittance to the cylinder, and compressing the thus admitted air in the cylinder with the piston through a ratio that will force a sufficient amount of the combustion air from the main combustion chamber through the reduced cross section passage into the auxiliary combustion chamber which, when mixed with the quantity of gas fuel in the auxiliary combustion chamber, will form a combustible mixture therein at all loads.

2. The method of claim 1 in which the engine is a four-cycle engine, and further characterized by the step of supplying all of and only gas fuel directly to the auxiliary combustion chamber before all of the combustion air has been supplied to the cylinder.

3. The method of claim 1 in which the engine is a two-cycle engine, and further characterized by the step of timing the admission of the gas fuel so that part of it is admitted during at least the initial part of the compression stroke.

4. The method of claim 3 further characterized by and including the step of admitting a quantity of bleed air directly to the auxiliary combustion chamber to somewhat dilute the mixture therein without reducing it to a combustible ratio so that, when combustion air is forced through the reduced cross section passage into the auxiliary chamber, a combustible mixture will result in the auxiliary combustion chamber.

References Cited in the file of this patent

UNITED STATES PATENTS

| | | |
|---|---|---|
| 1,271,942 | Ricardo | July 9, 1918 |
| 1,354,786 | Tartrais | Oct. 5, 1920 |
| 1,649,700 | Jobes | Nov. 15, 1927 |
| 2,065,419 | Bagnulo | Dec. 22, 1936 |
| 2,314,175 | Summers | Mar. 16, 1943 |
| 2,511,405 | Hoover | June 13, 1950 |